Jan. 28, 1930.   H. W. SISSON   1,745,278
HEADLIGHT LENS
Filed April 18, 1927   3 Sheets-Sheet 1
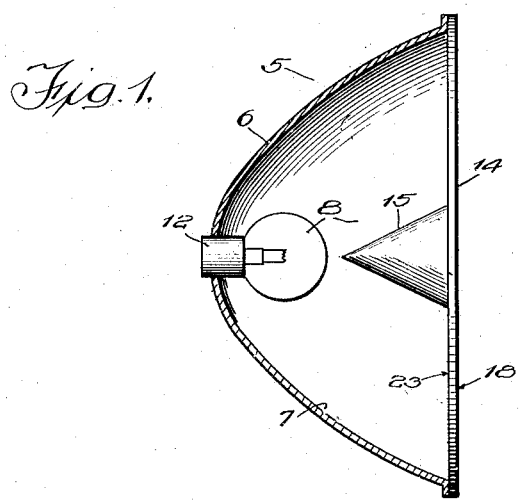
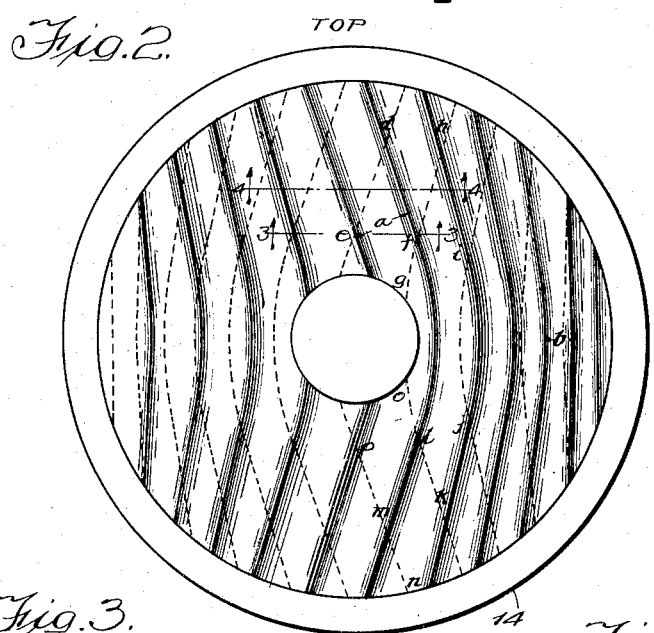
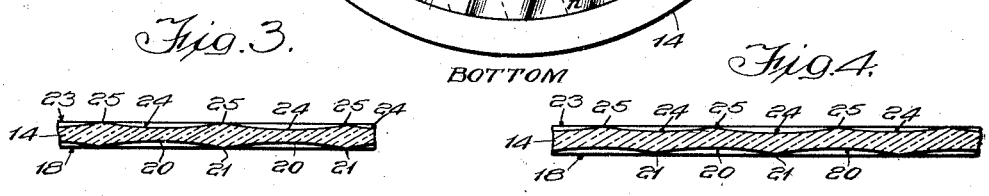
Inventor
Harry W. Sisson Jan. 28, 1930.                H. W. SISSON                 1,745,278
                              HEADLIGHT LENS
                          Filed April 18, 1927        3 Sheets-Sheet 2
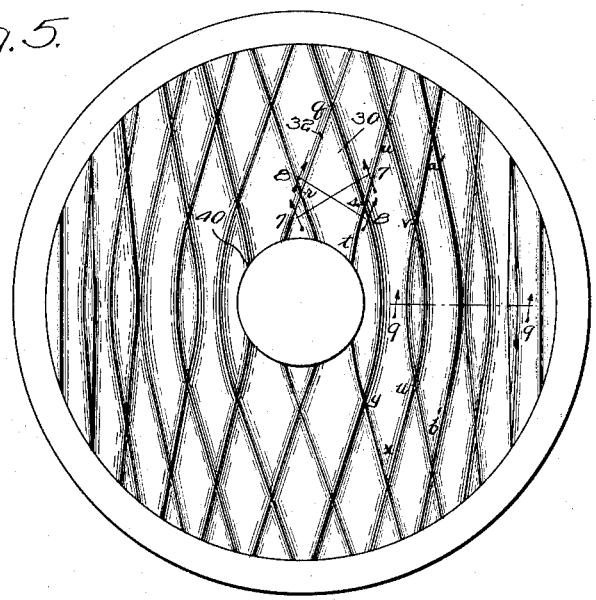
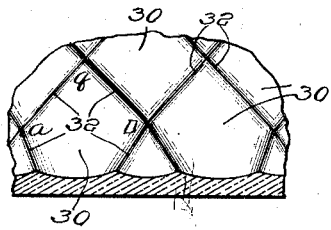
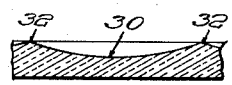
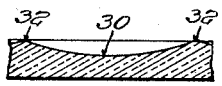

Jan. 28, 1930.  H. W. SISSON  1,745,278
HEADLIGHT LENS
Filed April 18, 1927   3 Sheets-Sheet 3

Witness:
William P. Kilroy

Inventor:
Harry W. Sisson
By Brown, Critchlow & Dinner
Attys.

Patented Jan. 28, 1930

1,745,278

UNITED STATES PATENT OFFICE

HARRY W. SISSON, OF HAMMOND, INDIANA

HEADLIGHT LENS

Application filed April 18, 1927. Serial No. 184,452.

This invention relates to improvements in lens for use in light projectors and its object is the provision of a generally improved and simplified lens that may be economically produced and conveniently installed and which will produce a better light diffusion and more advantageous beam without the necessity of a special reflector or particular lamp construction.

While more particularly adapted for use with the headlights of motor vehicles and the like, it is to be understood that the invention is applicable to the headlights of locomotives, also for interior lighting, display lighting and for various other uses and that, therefore, the invention may be employed wherever found suitable or desirable.

The invention is illustrated in the accompanying drawings, in which

Fig. 1 is a central longitudinal section through a headlight having a lens embodying my invention;

Fig. 2 is a front elevational view of the lens shown in Fig. 1;

Fig. 3 is a fragmentary section taken on the line 3—3 of Fig. 2;

Fig. 4 is a similar section taken on the line 4—4 of Fig. 2;

Fig. 5 is a front elevational view of another embodiment of the invention;

Fig. 6 is a fragmentary perspective view of the lens shown in Fig. 5;

Fig. 7 is a detailed section taken on the line 7—7 of Fig. 5;

Fig. 8 is a detailed section taken on the line 8—8 of Fig. 5;

Fig. 9 is a detailed section taken on the line 9—9 of Fig. 5;

Figure 10:
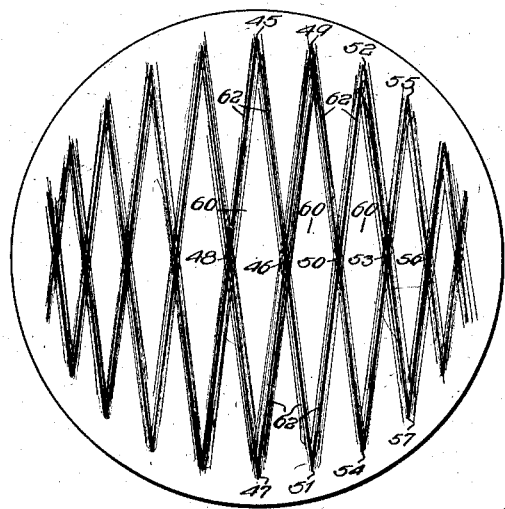
Fig. 10 is an elevational view of the back or inner side of another embodiment of the invention.

Referring to the drawings, the headlight shown is designated, generally, at 5. It may be of any suitable or preferred type.

Suffice it to say that the particular headlight shown comprises a shell casing 6, the inner concave surface 7 of which may be polished or finished to provide a reflector, and the incandescent or electric light bulb 8 is suitably mounted in the usual or any suitable manner, usually in the focus of the reflector 7. The bulb 8 is provided with a suitable connector 12 and, of course, the shell and reflector may be separate or independent instead of the inside of the shell constituting the reflector, as shown. The reflector need not be a special reflector but may be of any suitable or preferred form.

At the front, the device is provided with the lens 14 through which the direct and reflected rays of light are directed or projected ahead. The lens 14 may be provided with an anti-glare member 15 such as disclosed in my prior Patent No. 1,588,816, granted June 28, 1926, or this may be omitted.

In the embodiment of the invention shown in Figs. 1, 2, 3 and 4, the outer surface 18 of the lens 14 is provided with a series of arcuate corrugations, grooves or furrows 20.

Fig. 2 shows, on a reduced scale, substantially the relative radii of the curvature of the arcuate corrugations 20 and these corrugations may be of varying width from the greater width $a$ at the center to the smaller width $b$ at the outside, as shown in Fig. 2. The arcuate corrugations 20 may also be of varying curvature, straightening out vertically toward the sides of the lens. The extreme side corrugations may be even straight vertical corrugations, if desired.

The lens, as viewed in Figs. 2 and 5, is as looking from the back or inner side of the same, and the relative positions of the top and bottom in use are as designated, with the corrugations 20 extending in generally vertical directions from top to bottom. Each of the grooves 20 is concave or depressed centrally from the raised side edges 21, which may, for example, be in the plane of the front surface 18, although this may vary. The upper and lower ends of the grooves 20 may be re-curved slightly, or the grooves may be of regular arcuate formation from top to bottom, as shown.

Where the anti-glare member 15 is employed, the grooves 20 need not extend over the front surface or base thereof, and where the anti-glare member is omitted, the analogous central area of the lens may be left plain and ungrooved.

The opposite or rear surface 23 of the lens 14 is provided with a series of generally similar arcuate grooves 24, each of which is concave or depressed centrally from the raised edges 25 which may, for example, lie in the plane of the rear surface 23 of the lens. The grooves 24 may likewise be of varying width and curvature. They may be wider at the center of the lens and they may straighten vertically toward the sides. Of course, the curvature and width of the grooves 24 as well as the grooves 20 may be uniform across the lens.

The widths and curvatures shown are substantially to scale from an actual embodiment of the invention, but they may be varied as desired.

The grooves 20 and 24 are reversely curved across the lens and their projections through the lens intersect and, in effect, divide the lens into a plurality of figures $d$, $e$, $f$, $g$— $f$, $h$, $i$, $j$, $k$, $l$—$l$, $k$, $n$, $m$—$o$, $l$, $m$, $p$, and the like, each of which figures is bounded by a raised ridge or rib with the figure depressed centrally therefrom.

Where the lens is grooved or provided with the configurations above described and the source of light 10 is placed at or about the focal point of the reflector, I find that the light is diffused and spread horizontally across the road and that the width of vision therewith is increased. The rays also seem to be broken and the glare eliminated or reduced to some extent thereby.

The terms "vertical" and "horizontal" as used herein are with reference to the manner in which the lens is used in the headlight of an automobile, for example.

The grooves 20 and 24 are preferably molded in the lens in its formation, although they may, of course, be ground or otherwise formed therein.

In the embodiment of the invention shown in Figs. 5, 6, 7, 8 and 9, the configurations $q$, $s$, $t$, $r$—$u$, $v$, $w$, $x$, $y$, $s$—$s$, $y$, $t$—$a'$, $b'$, $w$, $v$, and the like, are all formed in one side of the lens. Each configuration is, as before, concave or depressed centrally at 30 from the raised marginal edges or ribs 32, but each figure is formed entirely in one side of the lens preferably the back or inner side, instead of being produced by the intersecting projections of corrugations in opposite sides of the lens. The formation of Figs. 5 to 9 is substantially the same as would be produced by intersecting corrugations in the same side of the lens.

The result produced with the lens of Figs. 5 to 9 is substantially the same as that produced by providing the opposite surfaces of the lens with corrugations, grooves or furrows, the projections of which intersect. As before, when these configurations are applied to the lens and the source or light 10 is placed at or about the focal point of the reflector, the light is diffused through the lens and spread horizontally across the road with an increased range of vision.

The central area 40 of the lens may be preferably left plain and without configurations, or it may be configurated or provided with an anti-glare member, as before. The widths of the configurations are shown as decreasing toward the sides of the lens, but this may also vary as before.

In the embodiment of Fig. 10 the figures 45, 46, 47, 48—49, 50, 51, 46—52, 53, 54, 50—55, 56, 57, 53 are generally diamond shaped and are graduated or diminished in width toward the sides of the lens. As before these figures are each depressed centrally at 60 from the marginal edges 62, which are straight instead of arcuate or curved as before. They are preferably molded or otherwise formed wholly or entirely in the rear or inner surface of the lens, although, as before, they may, of course, be produced by the intersecting projections of straight generally diagonal corrugations or other equivalent formations.

Figure 11:
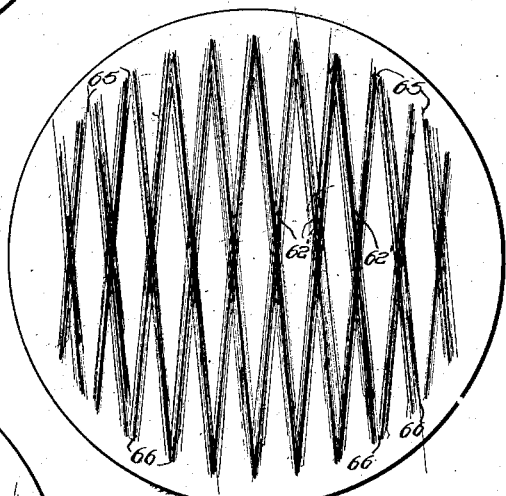
Figs. 11 and 12 are similar views of still further embodiments.

In the embodiment of Fig. 11 the figures are substantially the same as in the embodiment of Fig. 10 with the exception that their widths are equal or uniform instead of graduated or diminishing. The result is that the side figures are completely closed by the marginal edges 62' but their upper and lower ends are open at 65 and 66

Figure 12:
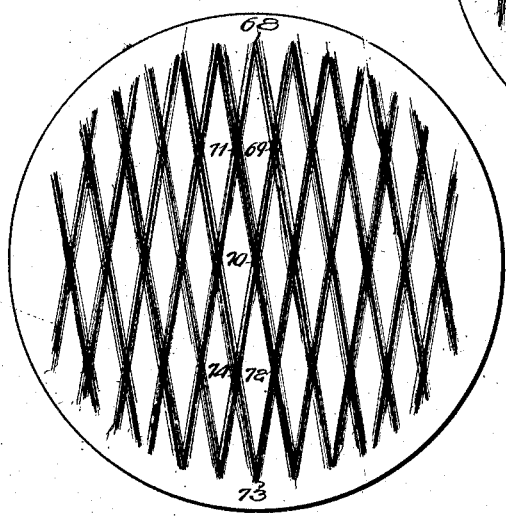

In the embodiment of Fig. 12 there is one figure 68, 69, 70, 71—above the other figure 70, 72, 73, 74 at the vertical median line of the lens and the lens is divided to a greater extent vertically. As before these figures may be substantially uniform or graduated and while preferably formed in the rear or inner side they may be formed in the other side or by the result of intersecting projections on opposite sides.

It is to be understood that the present invention may be applied completely across the lens, as shown, or it may be applied to any desired part of the lens and supplemented, as desired.

Figure 14:
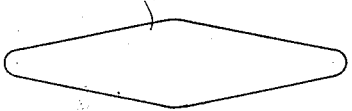
Fig. 14 is a diagrammatic view showing in a general way the contour of the projected beam.

The manner of breaking up the light projecting area of the lens, as described, provides an improved diffusion of the light through the lens. A relatively wide flat beam is projected somewhat as indicated generally at 80 in Fig. 14.

Figure 13:
Fig. 13 is a detail section showing another manner of forming the light diffusing figures.

The particular shape and manner of forming the configurations may be varied within the spirit and scope of the invention. For example, instead of the concave grooves or depressions, the figures may be formed by convex ribs or areas raised centrally and depressed marginally, as shown at 82 in Fig. 13.

In this specification, and in the claims, therefore, the term "corrugations" will be understood to include ribs and raised areas as well as grooves, furrows or any equivalent formation or configuration. Also, where I refer to intersecting corrugations it will be understood to include corrugations intersecting on the same side or on opposite sides of the lens with their projections intersecting.

I claim:—

1. A headlight lens comprising a generally circular transparent body divided horizontally across its width into a plurality of symmetrical figures each elongated vertically to substantially the vertical dimension of the projecting area of the lens in the vertical plane of the figure, the marginal edges of said figures being at an angle to a vertical plane passing thru said lens, and each figure diminishing from a longitudinal medium line thru the figure to the opposite end of the figure, said figures decreasing in height from the center toward the opposite sides of the lens to correspond with the circular contour of the lens with the widths of said figures diminishing from the center toward the opposite sides of the lens in substantial conformity with the decrease in height of said figures toward the sides, and the body of the lens having raised ridges bounding said figures and depressions between said ridges.

2. A headlight lens comprising a generally circular transparent body divided horizontally across its width into a plurality of symmetrical figures each elongated vertically to substantially the vertical dimension of the projecting area of the lens in the vertical plane of the figure, said figures decreasing in height from the center toward the opposite sides of the lens to correspond with the circular contour of the lens with the widths of said figures diminishing from the center toward the opposite sides of the lens in substantial conformity with the decrease in height of said figures toward the sides, and the body of the lens having raised ridges bounding said figures and depressions between said ridges, said depressions being of greatest depth substantially centrally of said figures and decreasing in depth toward said ridges.

3. A headlight lens comprising a generally circular transparent body divided horizontally across the width of the lens into a plurality of symmetrical figures, each elongated to substantially the vertical dimension of the projecting area of the lens in the vertical plane of the figure, said figures decreasing in height from the center of the lens toward the opposite sides of the lens to correspond with the circular contour of the lens with the width of said figures diminishing from the center toward the opposite sides of the lens in substantial conformity with the decrease in height of said figures toward the sides, the body of the lens having raised ridges bounding said figures and depressions between said ridges, said ridges comprising two parallel diagonally disposed and intersecting groups, and said depressions being of greater depth substantially centrally of said figures and decreasing in depth toward said ridges.

In witness whereof, I hereunto subscribe my name this 13th day of April, 1927.

HARRY W. SISSON.